Oct. 13, 1964   R. T. BROWN   3,152,504
APPARATUS FOR RECOVERING LEAD FROM STORAGE BATTERIES
Filed Dec. 6, 1961
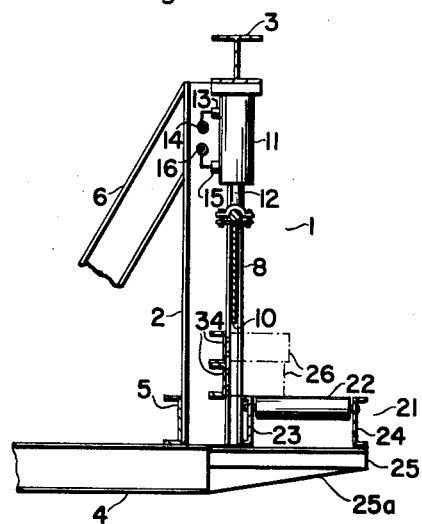
Fig. 1
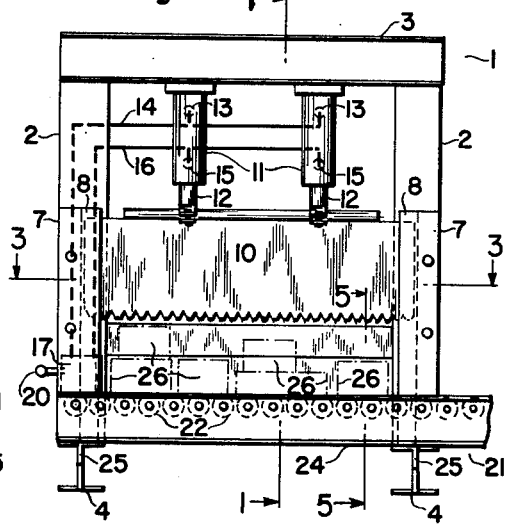
Fig. 2
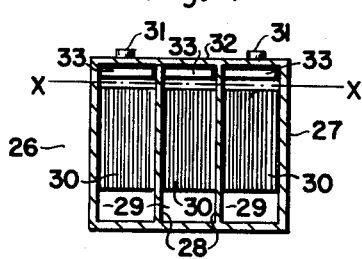
Fig. 4
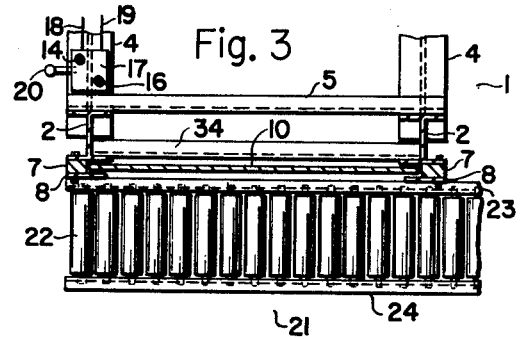
Fig. 3
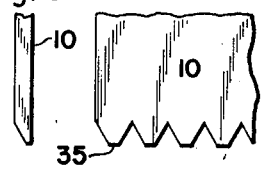
Fig. 5
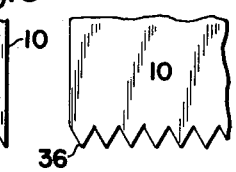
Fig. 6   Fig. 8
Fig. 7   Fig. 9
INVENTOR
Robert T. Brown
BY  Jack Schuman
ATTORNEY

United States Patent Office 3,152,504
Patented Oct. 13, 1964

3,152,504
APPARATUS FOR RECOVERING LEAD FROM
STORAGE BATTERIES
Robert T. Brown, John St., Butztown, Pa.
Filed Dec. 6, 1961, Ser. No. 157,516
10 Claims. (Cl. 83—419)

This invention relates broadly to apparatus for recovering lead from storage batteries and, specifically, to a power-operated shear particularly and peculiarly adapted to open storage battery casings in a plane between the battery connectors and battery plates, whereby the very heavy storage batteries can be efficiently handled at a rate in excess of three times the rate attainable by conventional means and methods, and whereby most or all of the storage battery casing is freed from the lead prior to the smelting operation.

A necessary concomitant to our automobile-based civilization is the periodic replacement of storage batteries in automobiles, trucks and similar vehicles. A sizable salvage industry has arisen based on the recovery of lead from worn-out storage batteries. Such lead, which may be found in the storage battery terminals, connectors and plates, is smelted and reused. Storage batteries represent very high density articles which are not easily handled and opened. The typical automobile storage battery may weigh 40 pounds, of which about 27 pounds is lead, having a current market price of some 4½–5 cents per pound. The typical truck storage battery may weigh 120 pounds, with proportionately more lead. In addition to metallic lead, storage batteries, when exhausted, contain several pounds of "mud" having chemical values therein worth approximately 5 cents per pound at the current market. When the huge number of storage batteries replaced every year in this country is considered, it is not difficult to appreciate the importance to the industry of a rapid efficient approach to the problem of opening the storage battery casings.

One method of opening storage battery casings involves the rather primitive use of an axe. This method of necessity is very slow and laborious and, also, is not without danger due to the sulphuric acid electrolyte in the casing. Further, as wages increase, this method becomes economically unfeasible, if not impossible.

Another method, which has to a large measure replaced the method mentioned in the paragraph above, involves the use of an oven to heat and thereby to soften the bituminous-based battery casing so as to permit the heavy lead plates to drop out. This method introduces a sticky coating of casing material on the lead plates, making the same difficult to handle and even more difficult and expensive to smelt; further, this method does not permit the recovery of the valuable "mud" in the casing. Moreover, modern battery casings are now being made of plastics which are of a thermosetting nature and which therefore preclude the use of the oven method to heat and soften the said casings.

The industry has felt a sharp and pressing need for a better way to open storage battery casings. I have designed, developed, constructed and successfully operated the machine described in this specification and have found the same to be eminently successful in practice and inexpensive in operation. Previously, with a three man crew, the "oven" method could "turn out" approximately 100-150 casing per hour, producing a relatively low grade lead for smelting and with a complete waste of valuable battery mud. With the same three man crew and with my invention, approximately 500 casings per hour are opened, producing a much higher grade for smelting as well as permitting salvage of battery "mud."

Briefly, my invention comprises a power operated shear arranged and adapted to cut through a storage battery casing along a plane lying between the bottom of the connectors and the tops of the plates of virtually all storage batteries made, without crushing the said plates or connectors and without fragmenting the casing and thereby decreasing the quality of the lead salvaged.

One of the objects of my invention is the provision of a power operated shear arranged and adapted to cut through a storage battery casing along a plane lying between the bottom of the connectors and the tops of the plates of virtually all storage batteries made, without crushing the said plates or connectors and without fragmenting the said casing.

Another object of my invention is the provision of apparatus for the efficient and economical handling of storage batteries in combination with particularly arranged power operated shears for the recovery of high grade lead and valuable battery "mud" with minimum danger to the operating crew.

Other and further objects of my invention will become apparent during the course of the following description.

Referring now to the drawing, in which like numerals represent like parts in the several views:

FIGURE 1 represents a side elevation and section of my invention, taken along the line 1—1 of FIGURE 2.

FIGURE 2 represents an end elevation, showing in phantom several storage battery casings in position to be sheared open.

FIGURE 3 represents a section in plan taken along the line 3—3 of FIGURE 2.

FIGURE 4 represents a vertical section of a typical storage battery showing the structure thereof and also showing the cutting plane of the shear blade.

FIGURE 5 represents an enlarged vertical section taken along the line 5—5 of FIGURE 2, showing phantom a storage battery casing in position for shearing.

FIGURE 6 represents an enlarged end view of one form of shear blade.

FIGURE 7 represents an enlarged front view of a preferred form of shear blade.

FIGURE 8 represents an enlarged end view of a preferred form of shear blade.

FIGURE 9 represents an enlarged front view of one form of shear blade.

Frame 1 is defined by vertical columns 2 secured to and supporting cross beam 3, said columns 2 being secured to and supported by foundation beams 4 and further being braced to each other by channel 5 and being braced to the said foundation beams 4 by brace beams 6. Spacer plates 7 and cover plates 8 are secured to each column 2 in such manner as to define slots 9 slidably receiving shear blade 10. Hydraulic cylinders 11 are secured to and supported by cross beam 2, and the piston rods 12 of the said hydraulic cylinders 11 are secured to shear blade 10 in a manner which forms no part of this invention. Hydraulic cylinders 11 are arranged to operate in parallel; that is, upper ports 13 of the two hydraulic cylinders 11 communicate with line 14 and lower ports 15 of the two hydraulic cylinders 11 communicate with line 16. Lines 14 and 16 communicate with multi-position control valve 17, the latter in turn communicating with a source of fluid under pressure through pressure line 18 and return line 19. It will be seen that, when control valve 17 is set by control handle 20 to communicate pressure line 18 with line 14 and return line 19 with line 16, shear blade 10 will be forced downwardly; when control valve 17 is set by control handle 20 to communicate pressure line 18 with line 16 and return line 19 with line 14, shear blade 10 will be pulled upwardly. Control valve 17 is well known in the hydraulic art and need not be described herein in detail. It will be understood that the physical arrangement of lines 14, 16, 18 and 19 as shown in FIGURES 1 and 2 is diagrammatic only, and that the actual physical positions of the said lines 14, 16, 18 and 19 and of the control valve 17 may be varied as desired. Further, while two hydraulic cylinders 11 are shown, this number may be increased or may be reduced to one as required.

Roller conveyor 21, comprising rollers 22 mounted between side channels 23 and 24, is mounted to cover plates 8 through the said side channels 23 and may be further supported through members 25 and 25a secured to foundation beams 4.

A typical storage battery 26 is shown diagrammatically in FIGURE 4 as comprising casing 27 with interior partitions 28 defining the several cells 29 of the battery 26. Lead plates 30 are found in each cell 29. Lead terminals 31 project from the top 32 of the battery 26, and directly below the said top 32 are the lead connectors or conecting plates 33 in the cells 29. It will be apparent from FIGURE 4 that the bulk of the lead in the storage battery 26 is to be found in the plates 30. Not shown in FIGURE 4, but well known to those familiar with this art, is the sulphuric acid electrolyte in the battery as well as the "mud" which collects in the bottoms of the cells 29. It will be seen from an examination of FIGURE 4 that between the bottoms of connectors 33 and the tops of plates 30 is a region or plane through which the plates 30 proper do not extend. There are, of course, in the typical storage battery 26 small lugs or projections formed on the plates 30 which extend through this plane and by means of which lugs or projections electrical contact between plates 30 and terminals 31 is effected. These small lugs or projections are not shown in the figures as the scale thereof does not permit such detail. The line X—X passes through this region and represents a plane perpendicular to the plane of the drawing through which I pass shear blade 10. I have found that the optimum distance between the tops of terminals 31 and plane X—X is approximately 2 inches, and that in virtually all storage batteries such a plane X—X passes through the said storage batteries without touching lead other than the small lugs or projections on the plates 30; that is to say, shear blade 10 cuts substantially only through the material constituting the casings of the said storage batteries.

To insure that shear blade 10 passes through plane X—X, backup channels 34 are secured between columns 2 in such manner that, when terminals 31 abut backup channels 34, shear blade 10 will pass through storage battery 26 approximately through plane X—X. Thus, with a shear blade 10 of ½ inch thickness, the distance between adjacent faces of the said backup channels 34 and shear blade 10 will be approximately 1¾ inches. It will also be noted that channel 23 is sufficiently close to plane X—X to give adequate support to the casings 27 being opened by shear blade 10.

The preferred form of shear blade 10 is shown in FIGURES 7 and 8 as comprising a series of chisel-edge teeth 35; that is to say, when viewed in endwise elevation or section, the chisel-edge teeth 35 terminate in a point or sharp edge and, when viewed from the front or rear of the shear blade 10, the chisel-edge teeth 35 terminate in a straight edge.

FIGURE 9 shows a modified form of shear blade 10 as comprising a series of saw teeth 36. When viewed in endwise elevation or section, saw teeth 36 may appear as shown in FIGURE 6 or 8.

As a further modification of FIGURE 7, the endwise elevation or section thereof may appear as in FIGURE 6.

It is important to the successful operation of the apparatus of this invention that the shear blade 10 passes through casing 27 parallel to the top 32 thereof and remains in plane X—X. I have found that, when the teeth of the shear blade 10 are arranged as in FIGURE 5 relative to backup channels 34, pointing downwardly and away from the said channels 34, the storage batteries 26 will be continually urged towards backup channels 34 as the shear blade 10 descends, thereby insuring a parallel cut in plane X—X. Without this relative arrangement of teeth and backup channels 34, storage batteries 26 tend to change position and tilt as the shear blade 10 descends, resulting in a tapered cut.

In operation, storage batteries 26 are placed on roller conveyor 21 and are moved to position under shear blade 10, terminals 31 being placed in contact with backup channels 34. As shown in FIGURE 2, a number of storage batteries 26 may be placed side by side and in tiers to be opened by one downward pass of shear blade 10 upon actuation of control valve 17. The tops 32 fall through the space between backup channels 34 and side channel 23, and a trough (not shown) may be placed therebelow to catch the said tops 32 as well as the electrolyte. The opened casings 27 are then removed and inverted, to permit the lead plates 30 to drop out, as well as to permit the battery "mud" to drop out, suitable arrangements being made to collect the latter. The tops 32, with the valuable lead terminals 31 and connectors 33, may be placed in the same pile as the lead plates 30, or may be placed in a separate pile, in which latter instance two piles of lead of different quality are obtained.

In the preferred embodiment, the apparatus shown in the accompanying figures is placed on a truck, to permit salvage at various stockpiles and to save the expense of transporting the used storage batteries with electrolyte to a central salvage site.

The materials of construction used for this apparatus are suitably chosen to resist the corrosive effects of the electrolyte, as will be evident to those familiar with the art.

While I have shown the best embodiment of my invention known to me, I do not wish to be limited to the exact structure shown and described, but may use such modifications, substitutes or equivalents as are pointed out in the specification or embraced within the scope of the claims.

I claim:

1. For use with storage batteries each consisting of a casing, lead terminals projecting from the top of said casing, lead connector plates within said casing immediately adjacent the top thereof and in contact with said lead terminals, a plurality of spaced lead plates within said casing, and lugs on said lead plates extending towards and engaging said lead connector plates, said storage batteries having a plane therethrough parallel to the top of the casing and the tops of the lead terminals between said lead plates and said lead connector plates, which plane passes through the casing and the lugs only and does not pass through said lead plates or said lead connector plates, apparatus for opening said storage batteries along said plane comprising:

(a) a shear blade,
   (b) guide means in which said shear blade may be reciprocated in one direction or selectively in the opposite direction,
   (c) power means to force said shear blade in said guide means in one direction or selectively in the opposite direction,
   (d) conveyor means to bring said storage batteries to a position in the path of said shear blade and to support said storage batteries as the shear blade is passed therethrough, and
   (e) backup means on the side of said shear blade opposite the bottoms of said storage batteries and adapted to contact the lead terminals of said storage batteries to limit movement of said storage batteries,
   (f) said backup means being arranged relative to said shear blade to position said storage batteries with the said plane between the tops of the lead plates and the bottoms of the lead connector plates lying in the plane of the shear blade.

2. Apparatus as in claim 1, further including:

(g) a wedge-shaped edge on said shear blade tapering away from said backup means and adapted to engage said storage battery casings, (h) whereby said storage batteries are urged towards said backup means as said shear blade is passed therethrough.

3. Apparatus as in claim 1, further including:
(g) a plurality of chisel-edged teeth on said shear blade tapering away from said backup means and adapted to engage said storage battery casings,
(h) whereby said storage batteries are urged towards said backup means as said shear blade is passed therethrough.

4. For use with storage batteries each consisting of a casing, lead terminals projecting from the top of said casing, lead connector plates within said casing immediately adjacent the top thereof and in contact with said lead terminals, a plurality of spaced lead plates within said casing, and lugs on said lead plates extending towards and engaging said lead connector plates, said storage batteries having a plane therethrough parallel to the top of the casing and the tops of the lead terminals between said lead plates and said lead connector plates, which plane passes through the casing and the lugs only and does not pass through said lead plates or said lead connector plates, apparatus for opening said storage batteries along said plane comprising:
(a) a vertically arranged frame,
(b) a shear blade,
(c) guide means in said frame in which said shear blade may be reciprocated upwardly or selectively downwardly,
(d) power means to force said shear blade in said guide means upwardly or selectively downwardly,
(e) roller conveyor means to bring said storage batteries to a position below said shear blade and in the path of said shear blade and to support said storage batteries as the shear blade is passed therethrough,
(f) backup means mounted to said frame on the side of said shear blade opposite the bottoms of said storage batteries,
(g) the path of said shear blade lying between said backup means and said roller conveyor means,
(h) said backup means adapted to contact the lead terminals of said storage batteries to limit horizontal movement of said storage batteries towards the path of said shear blade,
(i) said backup means being arranged relative to said shear blade to position said storage batteries with the said plane between the tops of the lead plates and the bottoms of the lead connector plates lying in the plane of the shear blade, and
(j) a slot between said backup means and said roller conveyor means below and in the plane of said shear blade through which the tops of said storage batteries may drop after the shear blade has passed therethrough.

5. Apparatus as in claim 4, further including:
(k) a wedge-shaped lower edge on said shear blade tapering down and away from said backup means and adapted to engage said storage battery casings,
(l) whereby said storage batteries are urged towards said backup means as said shear blade is passed therethrough.

6. Apparatus as in claim 4, further including:
(k) a plurality of chisel-edged teeth on the lower edge of said shear blade tapering down and away from said backup means and adapted to engage said storage battery casings,
(l) whereby said storage batteries are urged towards said backup means as said shear blade is passed therethrough.

7. For use with storage batteries each consisting of a casing, lead terminals projecting from the top of said casing, lead connector plates within said casing immediately adjacent the top thereof and in contact with said lead terminals, a plurality of spaced lead plates within said casing, and lugs on said lead plates extending towards and engaging said lead connector plates, said storage batteries having a plane therethrough parallel to the top of the casing and the tops of said lead terminals between said lead plates and said lead connector plates, which plane passes through the casing and the lugs only and does not pass through said lead plates or said lead connector plates, apparatus for opening said storage battery along said plane comprising:
(a) support means adapted to support a plurality of storage batteries on their sides with their lead terminals facing in one direction,
(b) backup means adapted to engage the tops of the lead termials of all of said storage batteries,
(c) cutting means interposable between said backup means and the bottoms of said storage batteries and spaced from said backup means by a distance substantially equal to the distance between the tops of said lead terminals and said plane, said cutting means being adapted to pass through all of said storage batteries along said plane.

8. Apparatus as is claim 7, said cutting means being spaced approximately two inches from said backup means.

9. For use with storage batteries each consisting of a casing, lead terminals projecting from the top of said casing, lead connector plates within said casing immediately adjacent the top thereof and in contact with said lead terminals, a plurality of spaced lead plates within said casing, and lugs on said lead plates extending towards and engaging said lead connector plates, said storage batteries having a plane therethrough parallel to the top of the casing and the tops of said lead terminals between said lead plates and said lead connector plates, which plane passes through the casing and the lugs only and does not pass through said lead plates or said lead connector plates, apparatus for opening said storage battery along said plane comprising:
(a) support means adapted to support a plurality of storage batteries of different sizes stacked one upon the other in a tier with their lead terminals all facing in one direction,
(b) backup means adapted to engage the tops of the lead terminals of all of said storage batteries,
(c) cutting means interposable between said backup means and the bottoms of said storage batteries and horizontally spaced from said backup means by a distance substantially equal to the distance between the tops of said terminals and said plane, said cutting means being adapted to pass vertically through all of said storage batteries along said plane.

10. Apparatus as in claim 9, said cutting means being spaced horizontally approximately two inches from said backup means.

References Cited by the Examiner

UNITED STATES PATENTS

| | | | |
|---|---|---|---|
| 1,012,805 | 12/11 | Bryen | 83—467 |
| 1,313,244 | 8/19 | Anderson | 83—912 |
| 1,731,413 | 10/29 | Glasser | 83—912 |
| 2,281,366 | 4/42 | Metcalf | 83—639 |
| 2,398,275 | 4/46 | Alpert | 136—174 |
| 2,517,362 | 8/50 | Thompson | 83—694 |
| 3,039,343 | 6/62 | Richards | 83—639 |

WILLIAM W. DYER, JR., *Primary Examiner.*

ANDREW R. JUHASZ, *Examiner.*